(12) United States Patent
Kolar et al.

(10) Patent No.: US 9,103,373 B1
(45) Date of Patent: Aug. 11, 2015

(54) BEARING-SHAFT ASSEMBLY WITH BEARING AND METHOD OF ATTACHING A BEARING TO A SHAFT

(71) Applicant: HI-LEX CONTROLS, INC., Rochester Hills, MI (US)

(72) Inventors: Jeffrey W. Kolar, Livonia, MI (US); John Michael Heiberger, III, Grand Blanc, MI (US)

(73) Assignee: HI-LEX CONTROLS, INC., Rochester Hills, MI (US)

( * ) Notice: Subject to any disclaimer, the term of this patent is extended or adjusted under 35 U.S.C. 154(b) by 0 days.

(21) Appl. No.: 14/266,163

(22) Filed: Apr. 30, 2014

(51) Int. Cl.
| | |
|---|---|
| F16C 35/06 | (2006.01) |
| F16C 43/04 | (2006.01) |
| F16C 35/08 | (2006.01) |
| F16C 35/10 | (2006.01) |
| F16C 35/12 | (2006.01) |
| F16C 33/12 | (2006.01) |
| F16C 43/00 | (2006.01) |

(52) U.S. Cl.
CPC ............... *F16C 35/08* (2013.01); *F16C 33/12* (2013.01); *F16C 35/10* (2013.01); *F16C 35/12* (2013.01); *F16C 43/00* (2013.01)

(58) Field of Classification Search
CPC ...... F16C 33/04; F16C 33/125; F16C 33/583; F16C 33/605; F16C 33/785; F16C 35/063; F16C 35/073; F16C 35/12
USPC ................. 384/127, 201, 217, 295–296, 510, 384/537–539, 555, 559, 562, 585, 602, 627, 384/626, 903
See application file for complete search history.

(56) References Cited

U.S. PATENT DOCUMENTS

| | | | | |
|---|---|---|---|---|
| 718,376 | A | * | 1/1903 | O'Reilly ..................... 384/540 |
| 1,524,999 | A | * | 2/1925 | Sandberg ................... 384/538 |
| 3,912,412 | A | * | 10/1975 | Struttmann ................ 384/538 |
| 3,918,779 | A | * | 11/1975 | Halliger et al. ............ 384/538 |
| 3,953,142 | A | * | 4/1976 | Price et al. ................. 384/538 |
| 4,339,158 | A | * | 7/1982 | Greener et al. ............ 384/418 |
| 5,125,755 | A | * | 6/1992 | Adler et al. ................ 384/536 |
| 5,807,203 | A | * | 9/1998 | Imanishi et al. ............. 476/42 |
| 5,954,880 | A | * | 9/1999 | Aoki et al. ................. 118/423 |
| 5,993,069 | A | * | 11/1999 | Arrasmith et al. ......... 384/537 |
| 6,390,683 | B1 | * | 5/2002 | Hirose et al. .............. 384/476 |

(Continued)

FOREIGN PATENT DOCUMENTS

| | | | | |
|---|---|---|---|---|
| DE | 4320680 C1 | * | 1/1995 | ............ G11B 15/29 |
| DE | 202005007155 U1 | | 9/2006 | |

(Continued)

*Primary Examiner* — Marcus Charles
(74) *Attorney, Agent, or Firm* — Brinks Gilson & Lione

(57) ABSTRACT

A bearing-shaft assembly includes a shaft having a first cylindrical section and a second cylindrical section axially separated by a first annular groove. A bearing is arranged around the annular groove and axially overlaps with the first and second cylindrical sections. A first bushing fills a radial gap between the inner race of the bearing and the first cylindrical section. The first bushing has a first radial collar radially overlapping with the inner race and axially overlapping with the first cylindrical section. A second bushing fills a radial gap between the inner race and the second cylindrical section. The second bushing has a second radial collar radially overlapping with the inner race and axially overlaps with the second cylindrical section. The second bushing fills the first annular groove and is made of a softer material than the first bushing.

18 Claims, 4 Drawing Sheets

(56) References Cited

U.S. PATENT DOCUMENTS

| | | | |
|---|---|---|---|
| 6,893,160 B2 * | 5/2005 | Casey | 384/538 |
| 7,234,757 B2 | 6/2007 | Mitchell | |
| 7,344,313 B2 * | 3/2008 | Hansen et al. | 384/540 |
| 7,510,333 B2 * | 3/2009 | Tanner et al. | 384/492 |
| 7,566,092 B2 | 7/2009 | Paton et al. | |
| 7,665,794 B2 | 2/2010 | Kachouh | |
| 7,677,376 B2 | 3/2010 | Schachtl et al. | |
| 7,770,961 B2 | 8/2010 | Oxley | |
| 7,777,379 B2 | 8/2010 | Schulz | |
| 7,866,732 B2 | 1/2011 | Oxley | |
| 7,938,473 B2 | 5/2011 | Paton et al. | |
| 8,027,769 B2 | 9/2011 | Oualkadi et al. | |
| 8,156,838 B2 | 4/2012 | Batosky et al. | |
| 8,237,317 B2 | 8/2012 | Bochen et al. | |
| 8,286,518 B2 | 10/2012 | Bochen | |
| 8,375,814 B2 | 2/2013 | Hillen et al. | |
| 8,393,237 B2 | 3/2013 | Arenz et al. | |
| 8,398,310 B2 * | 3/2013 | Ehlert et al. | 384/495 |
| 8,508,170 B2 | 8/2013 | Bochen | |
| 8,540,433 B2 * | 9/2013 | Wendeberg et al. | 384/585 |
| 8,596,153 B2 | 12/2013 | Arenz | |
| 8,601,890 B2 | 12/2013 | Bochen | |
| 8,601,891 B2 | 12/2013 | Bochen et al. | |
| 2007/0175099 A1 | 8/2007 | Kachouh | |
| 2007/0179006 A1 | 8/2007 | Kachouh | |
| 2008/0046153 A1 | 2/2008 | Oualkadi et al. | |
| 2009/0000201 A1 | 1/2009 | Fahl | |
| 2011/0271776 A1 | 11/2011 | Reif | |
| 2011/0290050 A1 | 12/2011 | Kummer et al. | |
| 2012/0013143 A1 | 1/2012 | Schiegel | |
| 2012/0013759 A1 | 1/2012 | Chen | |
| 2012/0024092 A1 | 2/2012 | Schönherr et al. | |
| 2012/0256146 A1 | 10/2012 | Arnold et al. | |
| 2013/0020748 A1 | 1/2013 | Kohlhauser et al. | |
| 2013/0024076 A1 | 1/2013 | Fukui et al. | |

FOREIGN PATENT DOCUMENTS

| | | |
|---|---|---|
| DE | 102006042403 A1 | 6/2007 |
| DE | 102008062391 A1 | 6/2010 |
| DE | 102008062400 A1 | 6/2010 |
| DE | 202009006216 U1 | 7/2010 |
| DE | 102009033277 A1 | 1/2011 |
| DE | 202011106149 U1 | 1/2013 |
| JP | 2007331699 A | 12/2007 |
| JP | 2009531571 A | 9/2009 |
| JP | 2009531572 A | 9/2009 |
| JP | 2011021348 A | 2/2011 |
| JP | 2011106227 A | 6/2011 |
| WO | WO2009034141 A1 | 3/2008 |
| WO | WO2009034143 A1 | 3/2009 |
| WO | WO2013056780 A1 | 4/2013 |

* cited by examiner

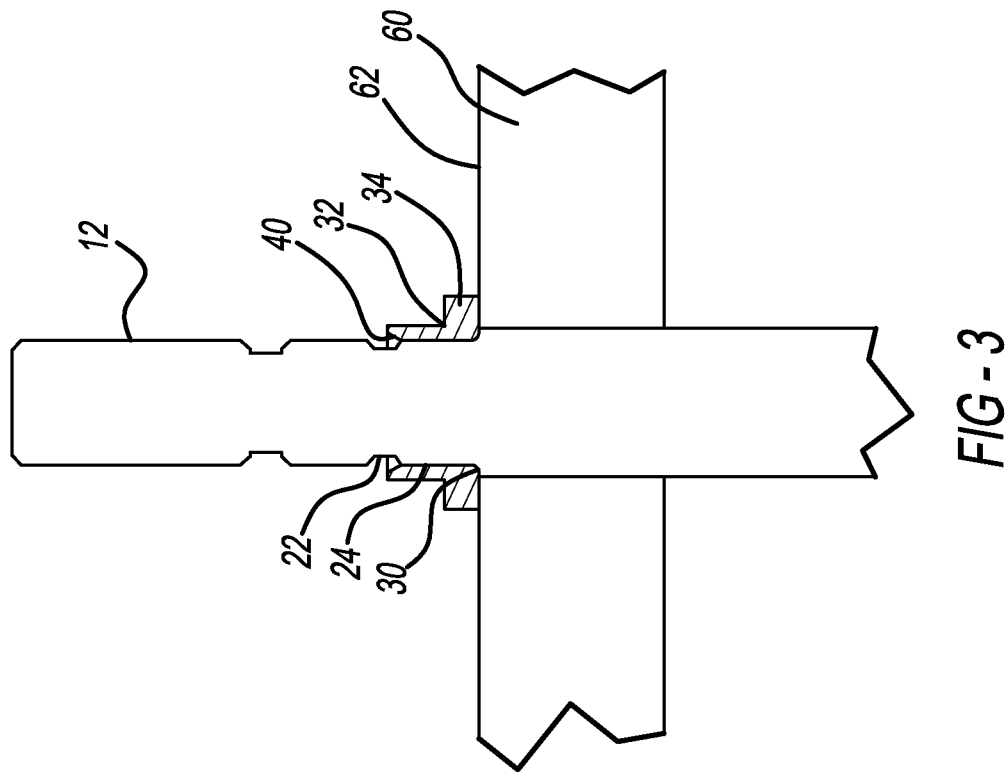
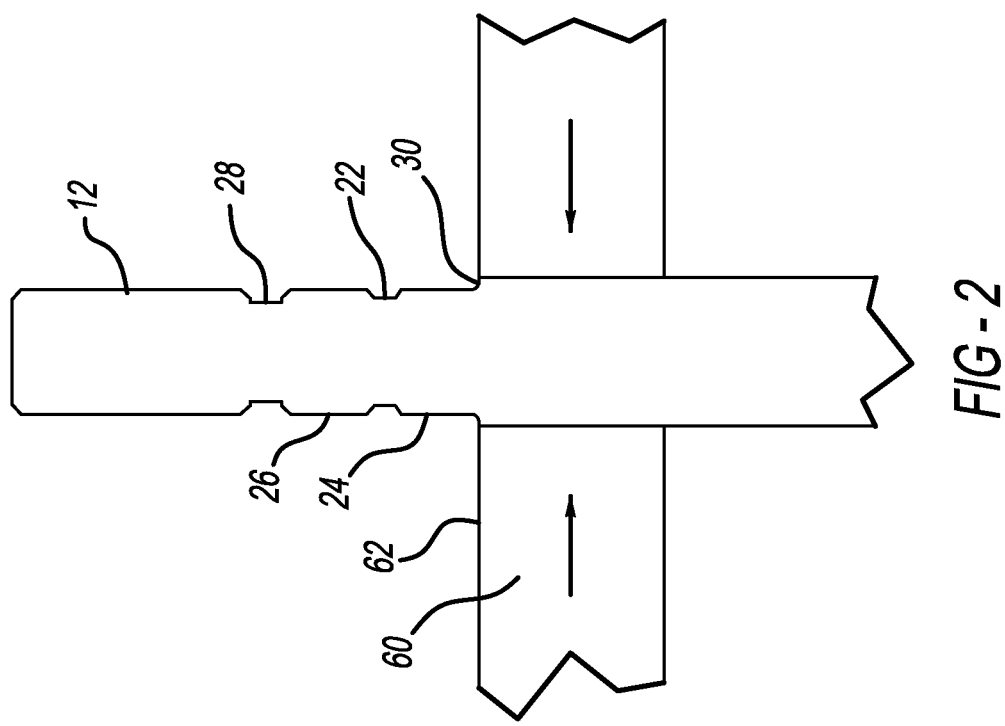

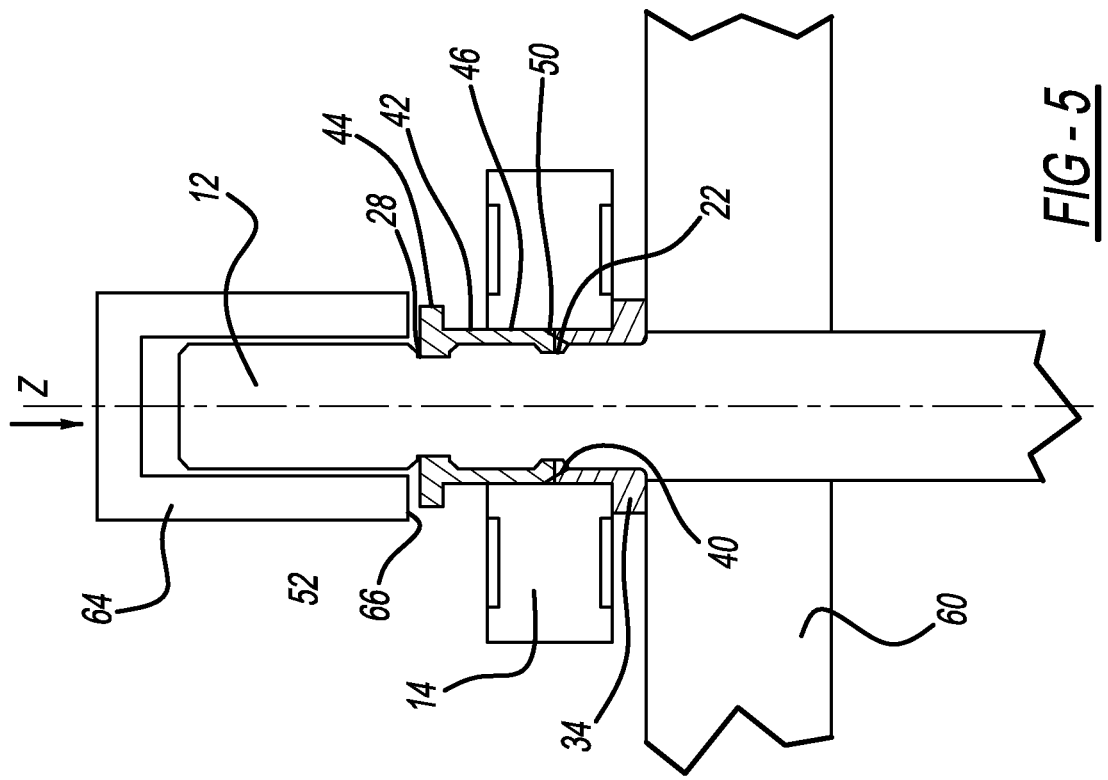
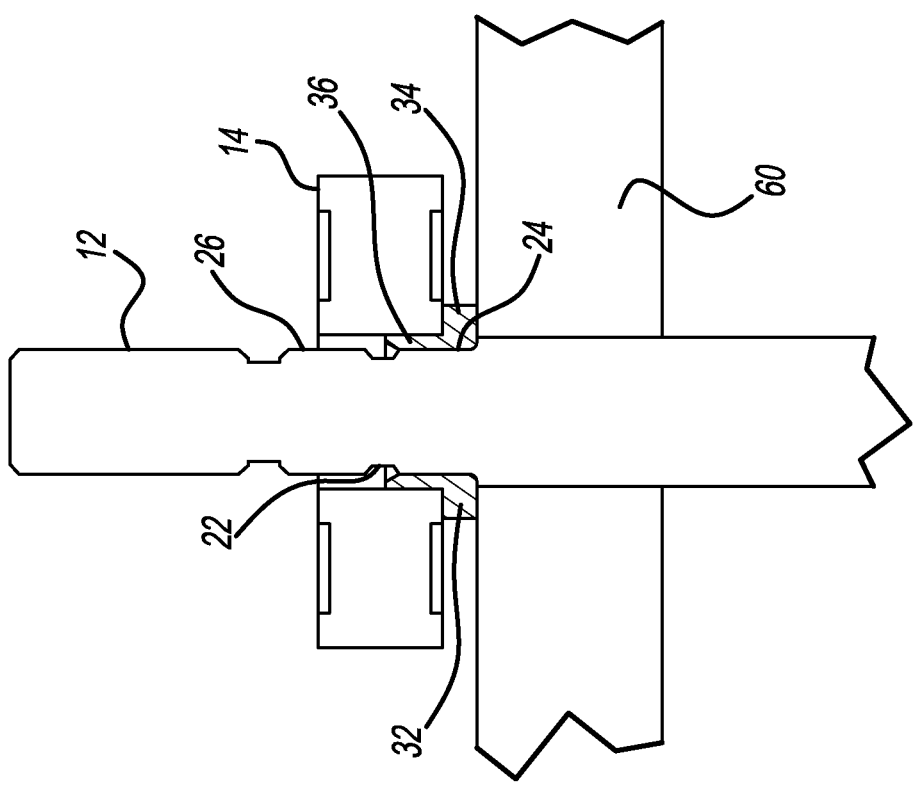

BEARING-SHAFT ASSEMBLY WITH BEARING AND METHOD OF ATTACHING A BEARING TO A SHAFT

TECHNICAL FIELD OF THE INVENTION

The present application relates to a bearing-shaft assembly with a bearing attached thereto and to a method of attaching a bearing to a shaft.

BACKGROUND OF THE INVENTION

In the automotive field, rolling element bearing assemblies are vital components in the numerous components of a vehicle.

Low friction operation and reliability are two of the key attributes for the selection of specific bearing assemblies. Another important factor is the ease of installation of the bearing assembly on a shaft. In one application, powered strut assemblies are used to support vehicle body panels such as rear hatch backs of the van and SUV type vehicles. In one design for such components the strut provides both weight balancing spring biasing as well as incorporating in an internal motor actuator for remote controlled movement of the body panels. These devices have one or more rolling element bearings supported within a hollow tube and support a rotatable shaft at the center of the tube. The rotatable shaft may be integrally formed with a threaded spindle that cooperates with a spindle nut to translate the shaft rotation into a linear movement of a part coupled to the spindle nut.

A typical rolling element type bearing assembly includes an inner race and an outer race with rolling bearing elements therebetween. In one application, for example the above-mentioned vehicle strut assembly, the inner race is locked to and rotates with a shaft. A separate outer race is fixedly connected to a supporting structure, such as the equipment framework or body or a strut tube. Smooth and efficient rotary motion of the inner race relative to the fixed outer race is achieved by a plurality of bearing elements, such as rollers or balls.

Several arrangements exist for mounting and locking the inner race of a bearing to a shaft, such as press fitting. In order to secure the inner race of the bearing to the shaft by press fitting, first the shaft is manufactured with a slightly oversized cross-sectional diameter as compared to the diameter of the inner race. The shaft is then forcibly fit into the inner race to effect the tight frictional engagement therewith.

Locking the inner race of the bearing to the shaft through press fitting has several shortcomings. In order to effectively lock the inner race and shaft together, these parts must be machined to very close tolerances, often within a few ten-thousandths of an inch. It is sometimes even necessary to heat the inner race of the bearing to cause it to temporarily expand to make it easier to slip over the end of the shaft. In these ways, and in other ways, such limitations result in more expensive bearing component and bearing assembly manufacturing costs.

Alternative arrangements may include clamp rings that axially secure the inner race on the shaft by engaging with grooves formed in the shaft on both axial sides of the inner race. Such clamp rings may be resilient so as to be snapped into the grooves. Because the snap rings and the grooves are premanufactured, they cannot compensate for manufacturing tolerances.

There is a continuing need for bearing shaft assemblies that are reliable and precise, while at the same time easy to manufacture at a low cost.

SUMMARY OF THE INVENTION

The present invention provides a bearing-shaft assembly with two bushings made of different materials of different hardness. The bushing of the softer material compensates for manufacturing tolerances by being plastically deformed to adapt its shape to the shaft and to the bearing attached thereto.

According to a first aspect of the invention, a bearing-shaft assembly includes a shaft with a first cylindrical section and a second cylindrical section axially separated by a first annular groove, a bearing, which is arranged around the annular groove and axially overlaps with the first and second cylindrical sections. The bearing forms a radial gap between an inner race of the bearing and the first and second cylindrical sections of the shaft. A first bushing fills the radial gap between the inner race and the first cylindrical section. The first bushing has a first radial collar radially overlapping with the inner race of the bearing and axially overlaps with the first cylindrical section. A second bushing fills the radial gap between the inner race and the second cylindrical section. The second bushing has a second radial collar radially overlapping with the inner race of the bearing and axially overlapping with the second cylindrical section. The second bushing fills the annular groove and is made of a softer material than the first bushing. By filling the annular groove, the second bushing forms a positively locking connection with the shaft that secures the inner race in a defined axial position on the shaft. This completed assembly ensures that the softer material of the second bushing eliminates any slack between the bearing and the shaft.

According to another aspect of the invention, the first and second bushings have an axial overlap, wherein the axial overlap of the first and second bushings is preferably in an axial area of the first annular groove and preferably the second bushing is arranged radially inward from the first bushing. This arrangement aids a displacement of the softer second bushing into the groove by plastic deformation, thereby axially locking the bearing on the shaft.

According to a further aspect of the invention, a second annular groove is formed in the shaft adjacent to the second cylindrical section. In the completed assembly, the second annular groove is preferably located outside the second bushing.

According to yet another aspect of the invention, a diameter-increasing radial shoulder may be provided in the shaft adjacent to the first cylindrical section. This step facilitates the proper axial placement for the first bushing. The diameter-increasing radial shoulder is preferably located outside the second bushing adjacent the second radial collar.

According to another aspect of the invention, the second bushing consists of a malleable material, for example by containing aluminum.

According to one aspect of the invention, a method of attaching a bearing to a shaft includes the following steps:

providing a shaft having a first cylindrical section and a second cylindrical section axially separated by a first annular groove;

providing a first bushing, the first bushing having a first radial collar radially extending outward;

placing the first bushing on the first cylindrical section adjacent the first annular groove with the radial collar axially arranged remote from the first annular groove;

placing a bearing on the first bushing adjacent the first collar;

providing a second bushing with a second radial collar radially extending outward, the second bushing being made of a softer material than the first bushing;

inserting the second bushing between the bearing and the second cylindrical section; and Exerting an axial force on the second radial collar, urging the second bushing toward the first bushing, until the second radial collar abuts the bearing and the second bushing fills out the first annular radial groove by plastic deformation.

According to another aspect of the invention, the second bushing has an inward rim axially opposite the second radial collar and the inward rim sinks into the first annular groove when the second bushing is inserted between the bearing and the second cylindrical section. Further, the second radial collar may have an inner collar, and the shaft may have a second annular groove on a side of the second cylindrical section remote from the first cylindrical section, wherein the inner collar sinks into the second annular groove when the inward rim sinks into the first annular groove. These arrangements promote a proper axial placement of the second bushing on the shaft prior to the plastic deformation.

According to yet another aspect of the invention the axial force is exerted until the second annular groove is free of the inner collar. This arrangement gives a visual indication of a proper axial placement of the second bushing on the shaft after the plastic deformation.

According to another aspect of the invention, the shaft may have a diameter-increasing radial shoulder adjacent to the first cylindrical section and the first bushing is placed on the first cylindrical section so as to axially abut the step with the first radial collar.

According to a further aspect of the invention, a tooling clamp may be secured on the shaft, the tooling clamp providing an axial surface flush with the diameter-increasing radial shoulder of the shaft as an abutment surface for the plastic deformation.

According to yet another aspect of the invention, the axial force is exerted by pressing a hollow cylindrical tool onto the first radial collar while the hollow cylindrical tool at least partially surrounds the shaft.

Further details and advantages of the present invention become apparent from the following description of the accompanying drawings. The drawings are purely provided for illustrative purposes and are not intended to limit the scope of the present invention.

BRIEF DESCRIPTION OF THE DRAWINGS

In the drawings,

FIG. 2 shows a first step of a method of attaching a roller bearing to a shaft suited for forming the bearing-shaft assembly of FIG. 1 according to a second aspect of the invention;

FIG. 3 shows a second step of the method of FIG. 2;

FIG. 4 shows a third step of the method of FIGS. 2 and 3;

FIG. 5 shows a fourth step of the method of FIGS. 2 through 4; and

DETAILED DESCRIPTION OF THE DRAWINGS

Figure 1:
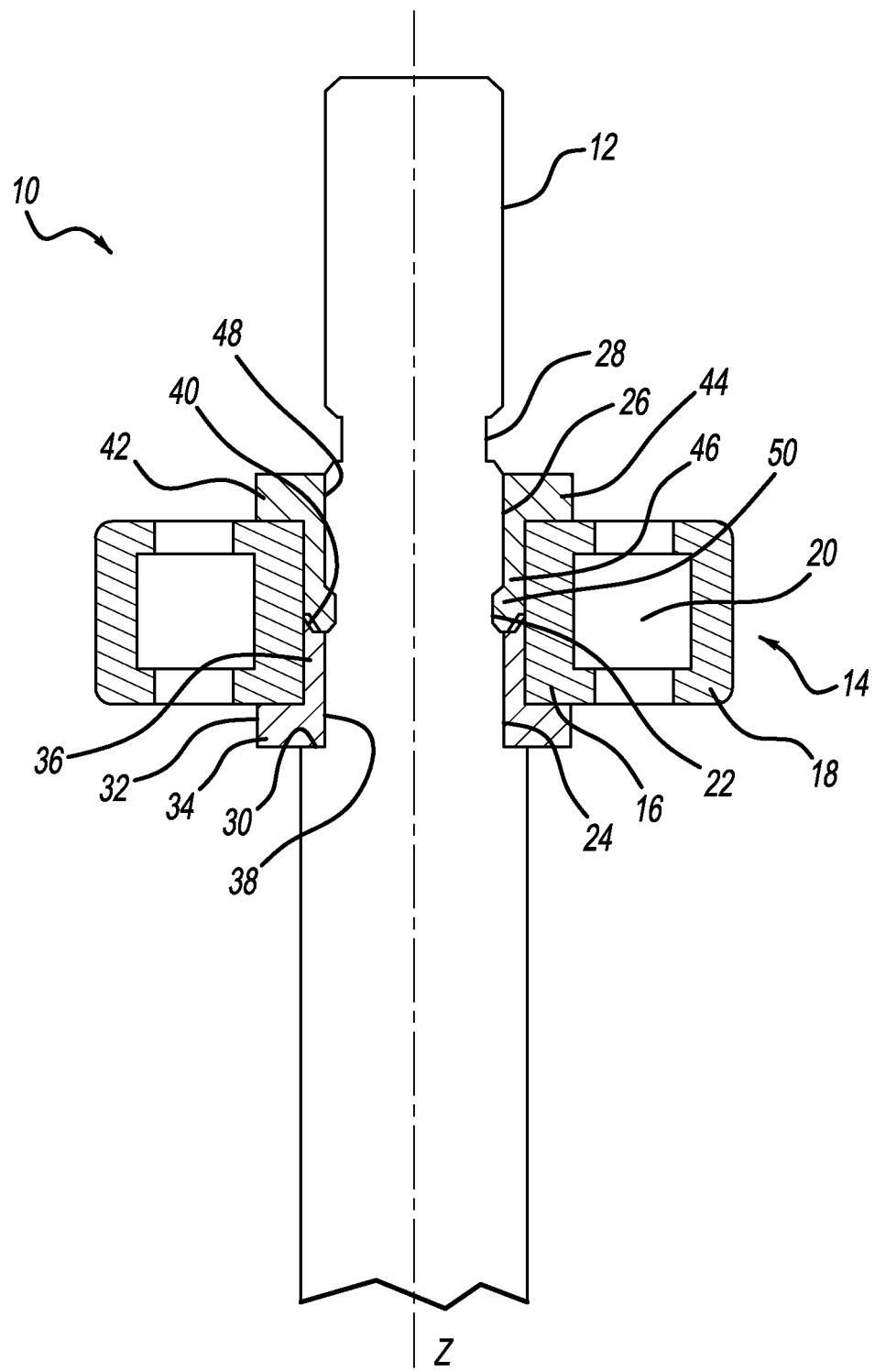
FIG. 1 shows a bearing-shaft assembly according to a first aspect of the invention.

FIG. 1 shows a bearing bearing-shaft assembly 10 according to a first aspect of the invention. A shaft 12, shown as an automotive strut shaft, has a central axis Z defining an axial direction. The shaft 12 has circular cross-sections across the central axis Z. A bearing 14 is schematically shown as having an inner race 16, an outer race 18, and a plurality of roller elements 20 arranged therebetween. Without limitation, the bearing may be a ball bearing or a roller bearing. The bearing 14 surrounds the shaft 12. In an axial location overlapping with the inner race 16, the shaft 12 has a first radial annular groove 22 that separates a first cylindrical section 24 from a second cylindrical section 26.

In the shown embodiment, the first annular groove 22 is arranged at the axial center of the inner race 16. The first and second cylindrical sections 24 and 26 are of the same diameter and the same axial length. It is, however, well within the scope of the present invention to arrange the first annular groove in an off-center location relative to the bearing. Further, the first and second cylindrical sections 24 and 26 may differ from each other in diameters or axial lengths without leaving the scope of the invention.

A second annular groove 28 is arranged adjacent to the second cylindrical section 26, opposite from the first annular groove 22. Both first and second annular grooves 22 and 28 are approximately twice as wide as they are deep. For facilitating the method of assembly described below, both first and second annular grooves 22 and 28 are chamfered to be wider at the shaft surface than at their bottoms. The second annular groove 28 has a larger volume than the first annular groove 22 by being deeper and wider. While the larger dimensions of the second annular groove 28 may ease the assembly steps described in detail below, the dimensions may be equal or similar to those of the first annular groove 22. The second annular groove 28 may be omitted. In the finished assembly as shown, it has no remaining function.

The second cylindrical section 24 is bordered by an outward radial shoulder 30 arranged opposite the first annular groove 22.

A first bushing 32 made of a relatively hard material, such as steel, abuts the radial shoulder 30 with a radial collar 34. The first bushing 32 further has an axial sleeve 36 extending radially between the inner race 16 and the first cylindrical section 24. The radial collar 34 forms an abutment for the inner race 16 of the bearing 14 and defines the axial position of the inner race 16. The first bushing 32 has a cylindrical inner wall 38 with a diameter matching the first cylindrical section 24. In an axial location coinciding with the transition from the first cylindrical section 24 to the first annular groove 22, the cylindrical inner wall 38 borders an outward chamfer 40 giving the interior of the axial sleeve 36 a funnel shape. The chamfer may have a straight contour or a curved contour. Preferably, it forms an angle of 20° to 40° with the central axis Z.

A second bushing 42 made of a relatively softer material than the first bushing, such as aluminum or an aluminum alloy, abuts the inner race 16 with a radial collar 44 axially opposite the radial collar 34 of the first bushing 32. The second bushing 42 further has an axial sleeve 46 extending radially between the inner race 16 and the second cylindrical section 26. The first bushing 32 has a cylindrical inner wall 48 with a diameter matching the second cylindrical section 26. In an axial location coinciding with the transition from the second cylindrical section 26 to the first annular groove 22, an inward rim 50 is attached to the cylindrical inner wall 48. The inward rim 50 substantially fills the volume between the first annular groove 22 on one radial side and the chamfer 40 as well as the inner circumference of the inner race 16 on the other side.

The bearing-shaft assembly of FIG. 1 or a similar assembly may be made by performing the steps illustrated in FIGS. 2 through 5.

Referring now to FIG. 2, a shaft 12 as described in connection with FIG. 1 has a first annular groove 22, first and second cylindrical sections 24 and 26 adjacent the first annular groove 22, and radial shoulder 30. The shaft 12 further includes the second annular groove 28. It should be noted, however, that the second annular groove 28 may be omitted without leaving the scope of the present invention as will be evident from the further description. In a first step, a tooling clamp 60 is secured to the shaft 12 to form a radial abutment surface 62 flush with the radial shoulder 30.

As shown in FIG. 3, the first bushing 32 is then placed on shaft 12 in such orientation that the radial collar 34 abuts both the radial shoulder 30 and the abutment surface 62. The first bushing 32 forms a slip fit with the first cylindrical section 24 of the shaft 12. The chamfer 40 overlaps with the first annular groove 22.

According to FIG. 4, the bearing 14 is placed on the axial sleeve 36 of the first bushing 32 in a slip fit connection so as to abut the radial collar 34 of the first bushing 32. The bearing 14 extends beyond the axial sleeve 36 and beyond the first radial groove 22 and surround a portion of both the first and the second cylindrical sections 24 and 26.

As FIG. 5 illustrates, the second bushing 42 is subsequently pushed onto the shaft 12. Due to its softer, elastic properties, it is possible to snap the inward rim 50 into the first annular groove 22. The second bushing 42 has a different shape before assembly than in the final assembly shown in FIG. 1. The inward rim 50 fills only a portion of the first annular groove 22 and leaves the space between the chamfer 40 and the first annular groove 22 free of material. Also, the radial collar 44 extends inward to form an inner collar 52 that snaps into the second annular groove 28. This snap fit between the inner collar and the second annular groove 28 helps with properly positioning the second bushing on the shaft 12 because the first annular groove is invisible behind the roller bearing. Additionally, the inner collar 52 provides additional material that can be displaced to promote filling the first annular groove 22. Should the second annular groove 28 be omitted, the inner collar 52 is likewise omitted.

Once the second bushing 42 has been placed in the proper axial position, an axial force is exerted on the radial collar 44 of the second bushing 42. A compression tool 64 is only schematically shown as a hollow cylinder. The compression tool has an inner diameter that allows sliding movement along the central axis Z of the shaft 12. The compression tool 64 has a generally flat end surface 66 with an outer diameter at least as great as the outer diameter of the radial collar 44 of the second bushing 42. The compression tool 64 may be mechanically, hydraulically, or pneumatically driven to push the second bushing 42 toward the tooling clamp 60. As the axial sleeve 46 of the second bushing 42 is driven between the bearing 14 and the shaft 12, the second bushing 42 undergoes a plastic deformation. The inward rim is moved farther into the first annular groove 22 to fill the space between the first annular groove 22 and the chamfer 40. As the axial sleeve 46 moves into the radial space between the bearing 14 and the shaft 12, the inner collar 52 moves out of the second annular groove 22, and the radial collar 44 abuts the bearing 14 from the axial side opposite the radial collar 34 to assume the shape shown in FIG. 1. By filling the annular groove 22, the second bushing 42 forms a positively locking connection with the shaft 12 that secures the inner race in a defined axial position on the shaft 12.

Finally, the compression tool 64 and the tooling clamp 60 are removed, and the bearing-shaft assembly 10 as shown in FIG. 1 is complete.

Because the second bushing 42 undergoes the plastic deformation to fill the gap, it adapts its shape to any manufacturing tolerances present in the assembled parts. Thus, the assembly can be manufactured with high precision without requiring expensive machining of the individual parts. The hardened first bushing provides durability of the assembly, and the simple compression process keeps the cost of assembly low.

Figure 6:
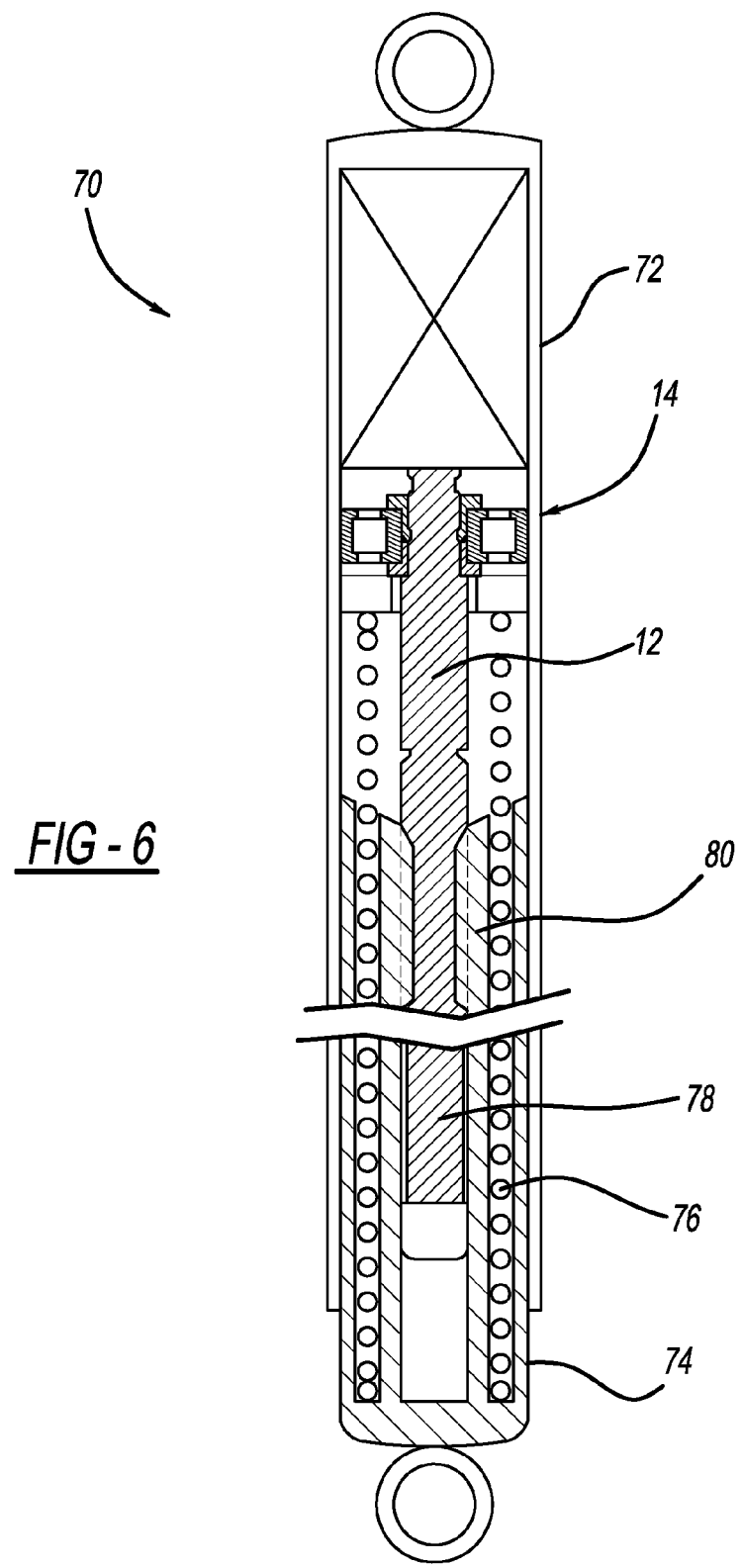
FIG. 6 shows a schematic drawing of a power strut for a vehicle liftgate incorporating the bearing-shaft assembly of FIG. 1.

Now referring to FIG. 6. an integrated power strut 70 is schematically illustrated, in which the shaft 12 is motor-driven and rotatably borne inside a first housing cylinder 72 configured to be mounted on a first vehicle part. The bearing 14 centers the shaft 12 in the first housing cylinder 72. A second housing cylinder 74 is telescopically movable relative to the first housing cylinder 72 and is configured to be mounted on a second vehicle part that is movable relative to the first vehicle part. A compression spring 76, shown as a mechanical spring, abuts parts of both the first housing cylinder 72 and the second housing cylinder 74 and biases them toward a longitudinal extension of the power strut 70. An externally threaded spindle 78 is integrally or unitarily formed with the shaft 12 and extends into the second housing cylinder 74. A spindle nut 80 with an internal thread engages the externally threaded spindle 78 and translates a rotary movement of the spindle 78 into a translatory movement of the spindle nut 80. Because the spindle nut 80 is fixedly secured to the second housing cylinder 74, a rotation of the spindle 78 in one direction extends the power strut 70, and a rotation in the opposite direction shortens it. Without limitation, the compression spring 76 may also be configured as a pneumatic spring.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. In particular, elements or features of one embodiment may be may be combined with or replace elements or features of a different embodiment. All such modifications and variations are within the scope of the invention as determined by the appended claims when interpreted in accordance with the breadth to which they are fairly, legally, and equitably entitled.

What is claimed is:

1. A bearing-shaft assembly comprising:
    a shaft having a first cylindrical portion and a second cylindrical portion axially separated by a first annular groove,
    a bearing arranged around the annular groove, the bearing axially overlapping with the first and second cylindrical portions and forming a radial gap between an inner race of the bearing and the first and second cylindrical portions;
    a first bushing having a first sleeve filling the radial gap between the inner race and the first cylindrical portion, the first bushing having a first radial collar axially adjacent the first sleeve and radially overlapping with the inner race of the bearing and axially overlapping with the first cylindrical portion;

a second bushing having a second sleeve filling the radial gap between the inner race and the second cylindrical portion, the second bushing having a second radial collar axially adjacent the second sleeve and radially overlapping with the inner race of the bearing and axially overlapping with the second cylindrical portion, the second bushing further filling the first annular groove, wherein the first bushing is made of a harder material than the second bushing.

2. The bearing-shaft assembly of claim 1, wherein the first and second sleeves have an axial overlap with each other.

3. The bearing-shaft assembly of claim 2, wherein the axial overlap of the first and second bushings with each other is in an axial area of the first annular groove.

4. The bearing-shaft assembly of claim 2, wherein in the axial overlap of the first and second sleeves with each other, the second sleeve is arranged radially inward from an outward chamfer in the first sleeve.

5. The bearing-shaft assembly of claim 1, further comprising a second annular groove in the shaft adjacent to the second cylindrical portion.

6. The bearing-shaft assembly of claim 5, wherein the second annular groove is located outside the second bushing.

7. The bearing-shaft assembly of claim 1, further comprising a diameter-increasing radial shoulder in the shaft adjacent to the first cylindrical portion.

8. The bearing-shaft assembly of claim 7, wherein the diameter-increasing radial shoulder is located outside the second bushing adjacent the second radial collar.

9. The bearing-shaft assembly of claim 1, wherein the second bushing consists of a malleable material.

10. The bearing-shaft assembly of claim 9, wherein the second bushing contains aluminum.

11. The bearing-shaft assembly of claim 1, wherein the assembly is arranged in an integrated power strut and the shaft is integrally formed with a threaded spindle.

12. A method of attaching a bearing to a shaft, the method comprising the steps of:
   providing a shaft having a first cylindrical portion and a second cylindrical portion axially separated by a first annular groove;
   providing a first bushing, the first bushing having a first sleeve and a first radial collar radially extending outward;
   placing the first bushing on the first cylindrical portion adjacent the first annular groove with the radial collar axially arranged remote from the first annular groove;
   placing a bearing on the first sleeve adjacent the first collar;
   providing a second bushing with a second radial collar radially extending outward and with a second sleeve of a softer material than the first sleeve;
   inserting the second sleeve between the bearing and the second cylindrical portion; and
   exerting an axial force on the second radial collar, urging the second sleeve toward the first sleeve between the bearing and the shaft, until the second radial collar abuts the bearing, and the second sleeve fills out the first annular groove by plastic deformation.

13. The method of claim 12, wherein the second sleeve has an inward rim axially opposite the second radial collar and the inward rim sinks into the first annular groove when the second sleeve is inserted between the bearing and the second cylindrical portion.

14. The method of claim 13, wherein the second radial collar has an inner collar and the shaft has a second annular groove on a side of the second cylindrical portion remote from the first cylindrical portion, wherein the inner collar sinks into the second annular groove when the inward rim sinks into the first annular groove.

15. The method of claim 14, wherein the axial force is exerted until the second annular groove is free of the inner collar.

16. The method of claim 12, wherein the shaft has a diameter-increasing radial shoulder adjacent to the first cylindrical portion and the first bushing is placed on the first cylindrical portion so as to axially abut the radial shoulder with the first radial collar.

17. The method of claim 16, further comprising a preceding step of securing a tooling clamp on the shaft, the tooling clamp providing an axial surface flush with the diameter-increasing radial shoulder of the shaft.

18. The method of claim 12, wherein the axial force is exerted by pressing a hollow cylindrical tool onto the first radial collar while the hollow cylindrical tool that at least partially surrounds the shaft.

* * * * *